Figure 1:
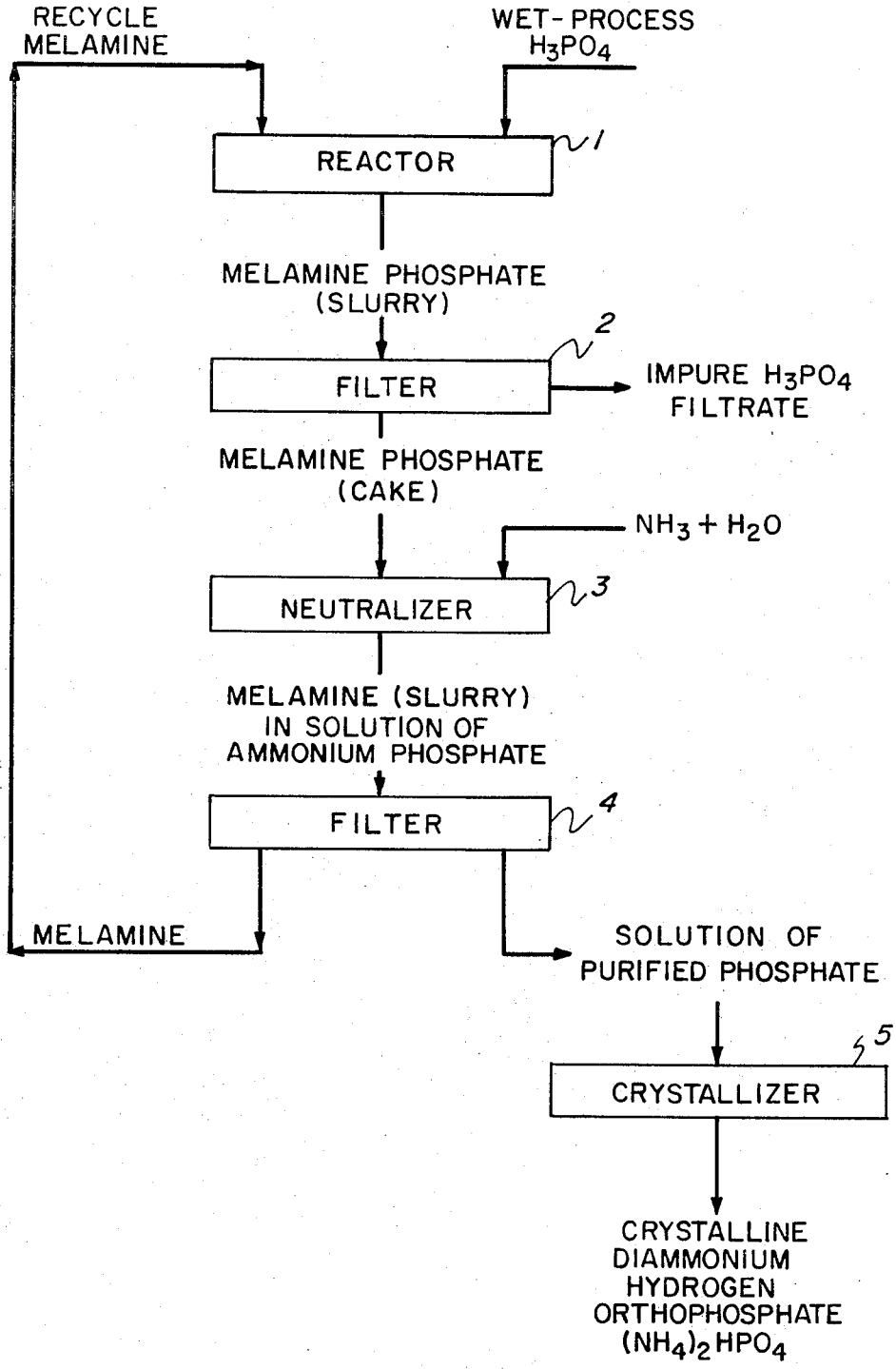
Figure 2:
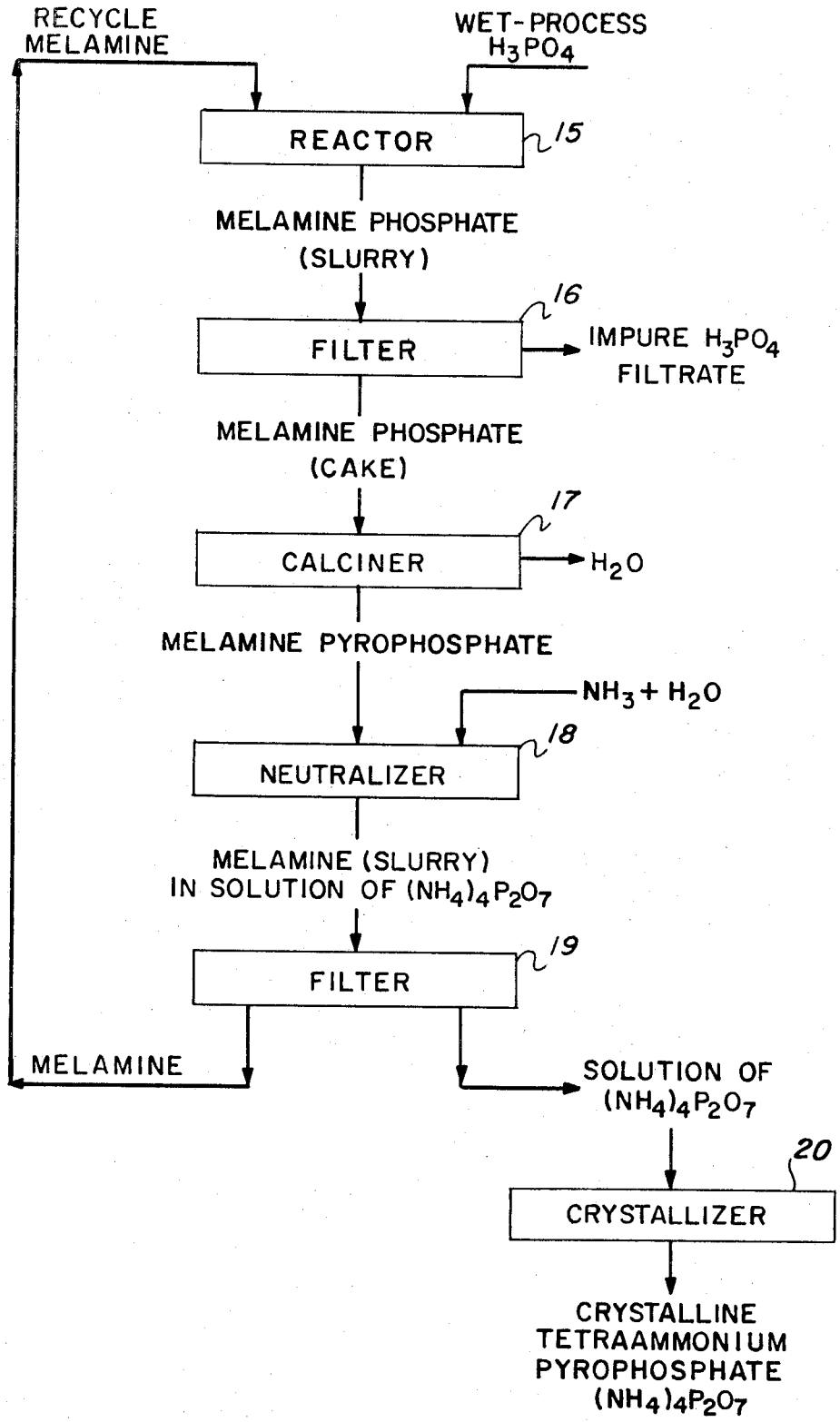
Figure 3:
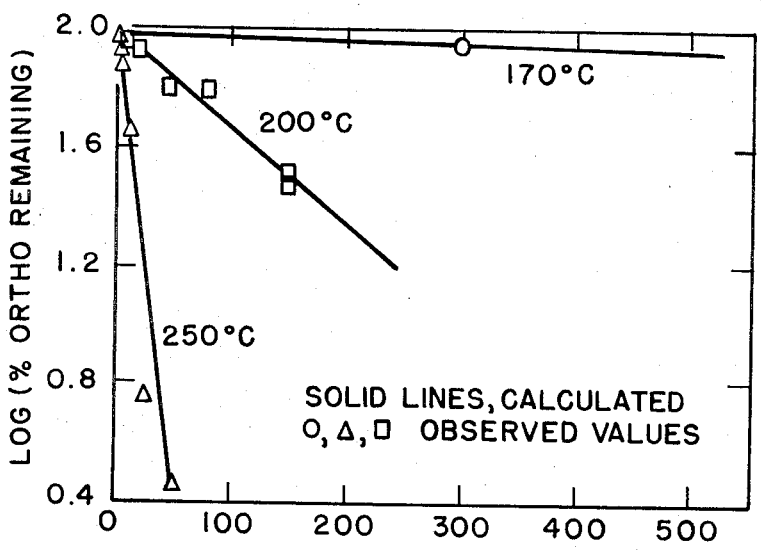
Figure 4:
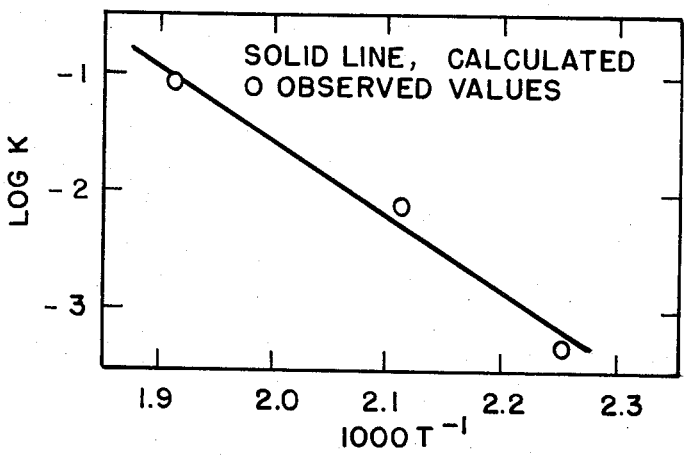

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 23, 1974

921 O.G. 1307

T921,024

METHOD OF PREPARING PURIFIED PHOSPHATES FROM IMPURE PHOSPHORIC ACID

Richard C. Sheridan, 105 Terrace, Sheffield, Ala. 35660

Filed Feb. 23, 1973, Ser. No. 335,377
Int. Cl. C01b *33/12*
U.S. Cl. 423—305
3 Sheets Drawing. 15 Pages Specification

Embodiment No. 1: Purified alkali metal or ammonium orthophosphates are prepared by adding melamine to impure wet-process phosphoric acid to form crystals of insoluble melamine orthophosphate which are separated from the mother liquor and caused to react with an aqueous solution of alkali metal or ammonium hydroxide or a salt thereof with an unstable volatile anion which is evolved as a gas from the solution, thereby forming crystals of melamine for recycle and a solution of the desired purified orthophosphate.

Embodiment No. 2: Alkali metal or ammonium pyrophosphates are prepared by heating melamine orthophosphate (prepared as for example in embodiment No. 1 supra) at 200° to 300° to convert it to melamine pyrophosphate and allowing it to react with an aqueous solution of alkali metal or ammonium hydroxide or a salt thereof containing an unstable volatile anion which is evolved as a gas from the solution, thereby forming crystals of melamine for recycle and a solution of the desired pyrophosphate. Relatively pure pyrophosphates are obtained from impure wet-process orthophosphoric acid.

PREPARATION OF AMMONIUM PHOSPHATE BY MELAMINE RECYCLE

PREPARATION OF AMMONIUM PYROPHOSPHATE BY MELAMINE RECYCLE

RATE OF CONDENSATION OF MELAMINE ORTHOPHOSPHATE

ARRHENIUS PLOT OF CONDENSATION OF MELAMINE ORTHOPHOSPHATE